(12) United States Patent
Callum

(10) Patent No.: US 6,295,604 B1
(45) Date of Patent: Sep. 25, 2001

(54) CRYPTOGRAPHIC PACKET PROCESSING UNIT

(75) Inventor: Roy Callum, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/085,317

(22) Filed: May 26, 1998

(51) Int. Cl.[7] ..................................................... H04L 9/00
(52) U.S. Cl. ..................... 713/160; 713/162; 713/189; 713/200
(58) Field of Search .................... 713/200, 189, 713/160, 162

(56) References Cited

U.S. PATENT DOCUMENTS

| | | | |
|---|---|---|---|
| 5,949,881 | * | 9/1999 | Davis ..................................... 713/189 |
| 6,021,391 | * | 2/2000 | Shyu ......................................... 705/1 |
| 6,026,490 | * | 2/2000 | Johns-Vano et al. ................. 713/200 |

OTHER PUBLICATIONS

*Data Encryption Standard (DES)*, National Institute of Standards and Technology, FIPS Pub 46–2 (Dec. 30, 1993).
*DES Modes of Operation*, National Institute of Standards and Technology, FIPS Pub 81 (Dec. 2, 1980).

* cited by examiner

*Primary Examiner*—Tod Swann
*Assistant Examiner*—Ronald F. Sulpizio, Jr.
(74) *Attorney, Agent, or Firm*—Blakely, Sokoloff, Taylor & Zafman LLP

(57) ABSTRACT

A cryptographic packet processing unit performing cryptographic operations on a data portion of a data packet based on control information included in a header of the data packet. The cryptographic packet processing unit comprises a cryptographic bus interface unit, a crypto-processing unit, and a control storage unit. The cryptographic bus interface unit is capable of (i) receiving the data packet and (ii) removing the control information from the data portion. Coupled to the cryptographic bus interface unit, the crypto-processing unit is capable of performing a cryptographic operation on the data portion under the control of the control storage unit, which contains the control information.

25 Claims, 5 Drawing Sheets

| Bit Numbers | Description |
|---|---|
| 63:40 | Reserved |
| 39 | 0=Encrypt; 1=Decrypt |
| 38:37 | Reserved |
| 36 | 0=ECB; 1=CBC |
| 35 | Reserved |
| 34:32 | DES Mode<br>000=DES<br>001<br>010 } = Reserved<br>011<br>100 = 3DES EDE3<br>101 = 3DES EDE2<br>110 } = Reserved<br>111 |
| 31:12 | Reserved |
| 11:0 | Packet Byte Count |

CRYPTOGRAPHIC PACKET PROCESSING UNIT

BACKGROUND

1. Field

The present invention relates to the field of cryptography. More particularly, the present invention relates to a cryptographic packet processing unit and its associated method of operation.

2. General Background

Over the last decade, computers have become an important product for both commercial and personal use, in part due to their versatility. For example, computers are commonly used as a vehicle to transfer information over a communication link such as private networks or public networks. "Private networks" include a local area network or any network having restricted access, while "public networks" include the Internet or any network allowing access to the public at large. In many situations, it may be desirable to encrypt digital information prior to transmission over the communication link so that the transmitted information is clear and unambiguous to a targeted recipient, but is incomprehensible to any illegitimate interlopers.

In 1981, the National Institute of Standards and Technology approved a data security process referred to as the "Data Encryption Standard." The Data Encryption Standard (DES) is a cryptographic function for encrypting and decrypting digital information through the use of a single, unique key. To ensure security of the transmitted information, the nature of the key is held in confidence between the source and the targeted recipient. DES is described in a Federal Information Processing Standards Publication (FIPS PUB 46-2) entitled "Data Encryption Standard (DES)" which was published on or around Dec. 30, 1993.

Currently, as shown in FIG. 1, a standard system 100 for supporting DES cryptography is shown. The system 100 comprises a DES cryptographic engine 110, which includes hardware and/or software responsible for encrypting or decrypting incoming data in accordance with the DES function. Within system 100, DES cryptographic engine 110 receives an incoming data stream fetched from a memory unit 120 by a memory controller 130. DES cryptographic engine 110 obtains a key from a separate cache memory 140 and performs a cryptographic operation on the incoming data stream based on the key received from cache memory 140.

The preformance of hardware might be improved when supporting video content streaming or other data streaming in which many keys are used in quick succession. For example, one disadvantage is that key management logic becomes more complex, especially when coordinating the proper usage of a large number of keys in quick succession. Another disadvantage is that the use of a small cache memory 140 for key storage is less efficient that using memory unit 120, in part due to overhead constraints associated with memory.

Hence, it would be desirable to create a cryptographic packet processing unit that is capable of utilizing memory unit 120 for key storage.

SUMMARY

In brief, one embodiment of the present invention includes an apparatus which comprises a cryptographic bus interface unit and a crypto-processing unit. The cryptographic bus interface unit is capable of separating control information of an incoming data packet from a data portion of that data packet. Coupled to the cryptographic bus interface unit, the crypto-processing unit is capable of performing a cryptographic operation on the data portion.

BRIEF DESCRIPTION OF THE DRAWINGS

The features and advantages of the present invention will become apparent from the following detailed description of the present invention in which.

DETAILED DESCRIPTION

Herein, an embodiment of a cryptographic packet processing unit, which performs encryption and decryption operations based on incoming data packets, is shown. Numerous details are set forth below in order to provide a thorough understanding of the invention. It should be apparent to one skilled in the art that the invention may be practiced by other embodiments without deviating from the spirit and scope of the invention. In other instances, well-known circuitry is not set forth in detail in order to avoid unnecessarily obscuring the invention.

In the detailed description, various terms are frequently used to describe certain characteristics or qualities. For example, "information" comprises data, address, control or any combination thereof. An "electronic system" includes any product having cryptographic processing functionality such as, for example, a computer (e.g., desktop, portable, server, etc.), an image production device (e.g., a facsimile machine, scanner, printer, etc.), a communication device (e.g., a digital cellular phone). "Logic" includes hardware or firmware which is defined herein as a combination of hardware and software.

With respect to terms relating to cryptography, a "key" is an encoding and/or decoding parameter used to modify a cryptographic operation. In this embodiment, the key includes 56-bits in succession, but it is contemplated that the key may be any bit size M, where "M" is a positive whole number greater than or equal to forty (40). The cryptographic operation may include, for example, (i) a symmetric key cryptographic function (e.g., DES), (ii) an asymmetric key cryptographic functions, or (iii) a hash function. A "hash function" is a function that converts incoming data of a variable length into a fixed-length result, where conversion of the fixed-length result back to the original data is virtually impossible. "Plaintext" is defined as non-encrypted, digital information while "ciphertext" is defined as encrypted digital information.

Figure 1:
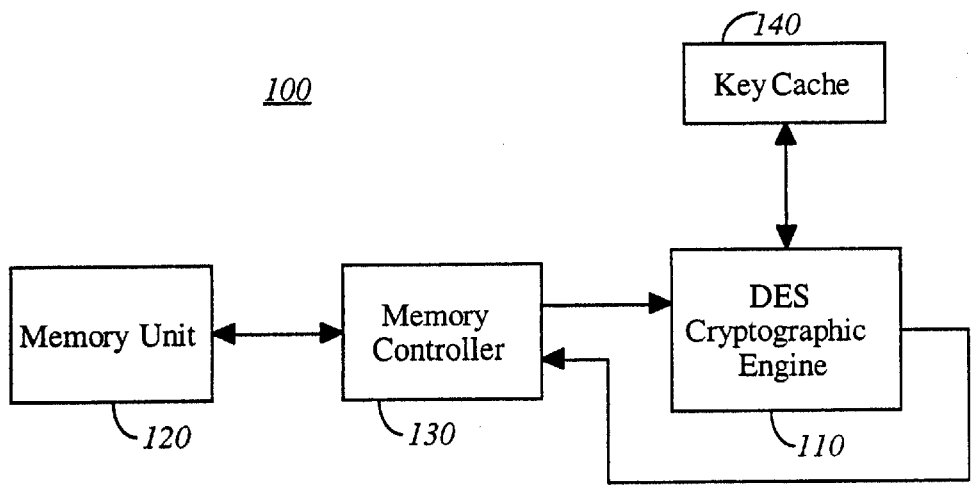
FIG. 1 is a block diagram of a conventional system incorporating a DES cryptographic engine relying on a cache memory to provide control information.
Figure 2:
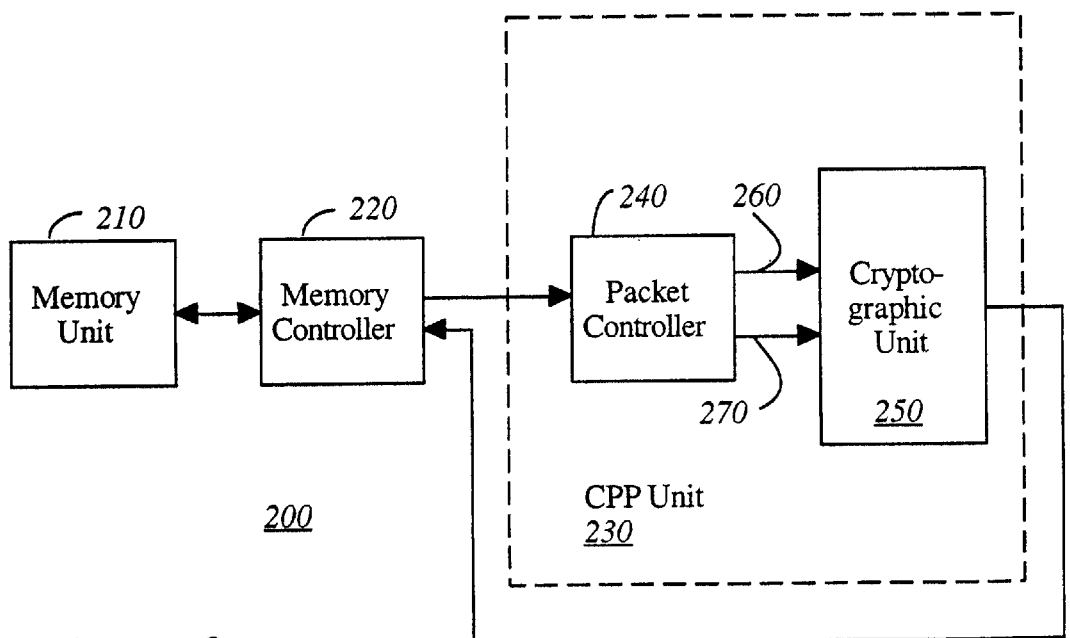
FIG. 2 is an illustrative embodiment of an electronic system utilizing a cryptographic packet processing unit in accordance with the present invention.

Referring to FIG. 2, an illustrative embodiment of an electronic system 200 utilizing the invention is shown.

Electronic system 200 comprises a memory unit 210, a memory controller 220 and a cryptographic packet processing (CPP) unit 230 which receives one or more data packets from memory controller 220. Each "data packet" includes a header and a data portion as described in FIG. 3. The size of the data packet may vary from a few bytes (e.g., around 20) to over a thousand bytes.

In this embodiment, memory unit 210 includes a volatile memory such as, for example, static random access memory (SRAM) for example. It is contemplated, however, that memory unit 210 may include non-volatile memory such as any type of erasable programmable read only memory (e.g., EPROM, EEPROM, etc.) or Flash memory. Memory controller 220 controls (i) the retrieval of a data packet from memory unit 210, and (ii) the storage of digital information within memory unit 210. CPP unit 230 comprises a packet controller 240 and a cryptographic unit 250. Packet controller 240 receives a data packet from memory controller 220, separates the control information in its header from the data portion, and separately transmits this information across signal lines 260 and 270, respectively. Cryptographic unit 250 encrypts or decrypts the contents of the data portion in accordance with the control information provided by the header.

Figure 3:
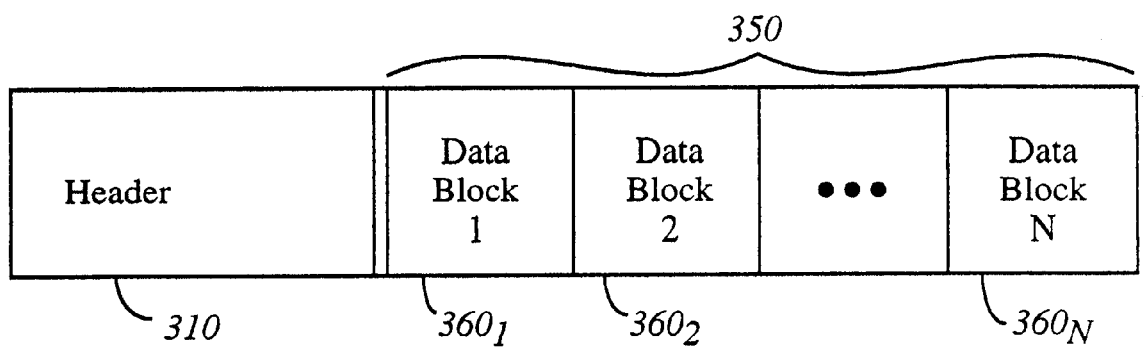
FIG. 3 is an illustrative embodiment of a data packet loaded into the cryptographic packet processing unit of FIG. 2.
Figures 4, 5:
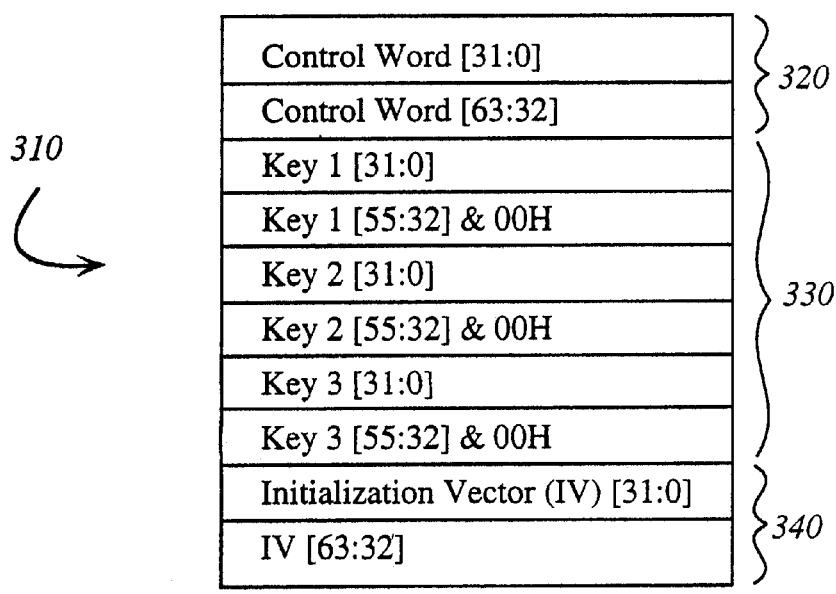
FIG. 4 is an illustrative embodiment of a header of the data packet of FIG. 3.
FIG. 5 is an illustrative embodiment of a control word contained in the header of FIG. 3.

Referring now to FIGS. 3–5, data packet 300 includes a header 310 and a data portion 350. In this embodiment, header 310 comprises control information including a control word 320, one or more keys 330 and an initialization vector (IV) 340 as shown in FIG. 4. Control word 320 provides information to control the functionality of CPP unit 230 of FIG. 2. The keys 330 and IV 340 are used by CPP unit 230 to perform encryption or decryption operations.

As shown in FIG. 5, one embodiment of control word 320 includes a plurality of bit fields 321–324. These bit fields 321–324 provide the CPP unit with information concerning the length of data packet 300 of FIG. 3, the mode of operation (encryption/decryption), and optionally, the type of cryptographic technique used. It is contemplated that different bit lengths associated bit fields 321–324 may be utilized other than the bit lengths illustrated herein.

In particular, as shown in FIGS. 3 and 5, first bit field 321 contains a byte count which indicates the number of bytes in data packet 300, and second bit field 322 includes one or more bits which indicate whether encryption or decryption is to be performed on data portion 350 of the incoming data packet. As optional bit fields of control word 320, third/forth bit fields 323 and 324 indicate the type of cryptographic operation to be performed. For example, if the CPP unit supports DES, third bit field 323 may indicate a selected DES mode (e.g., triple key DES) and fourth bit field 324 may indicate whether Cipher Block Chaining (CBC) or Electronic Codebook (ECB) is desired. The operations associated with CBC and ECB are set forth in a Federal Information Processing Standard Publication (FIPS Pub. 81) entitled "DES Modes of Operation" published on or around Dec. 2, 1980. It is contemplated that other types of cryptographic operations would assign bit fields 323 and 324 to provide different information.

Referring back to FIGS. 2 and 4, header 310 further includes keys 330 and IV 340. In this embodiment, three (3) keys are provided, each key being at least 56-bits in length, although any bit size may be used so long as it is in accordance to the cryptographic standard followed by CPP unit 230. In the event that a 32-bit data bus is implemented between memory controller 220 and CPP unit 230, two data transfers maybe employed, in this embodiment to transfer one of the keys 330 as shown in FIG. 4. Initialization vector (IV) 340 is a binary vector used as a randomizing block of data that is exclusively OR'ed (XOR) with a first data block in CBC mode.

Referring back to FIG. 3, data portion 350 includes N data blocks $360_1$–$360_N$, where "N" is a positive whole number. In this embodiment, a "block" is a 32-bit word. The sizing of the word is constrained by the bit width of the cryptographic bus situated between memory controller 220 and CPP unit 230 of FIG. 2.

Figure 6:
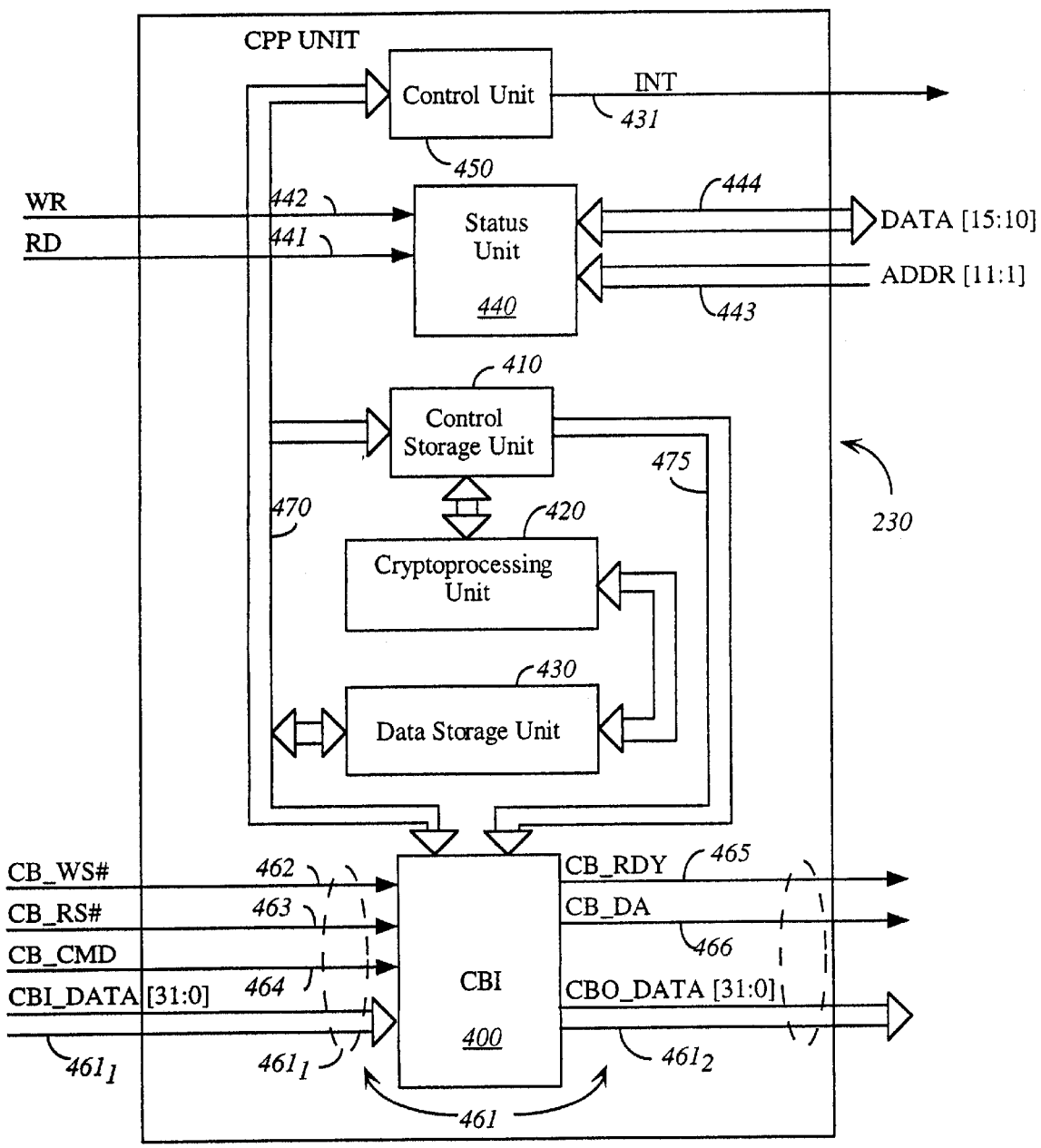
FIG. 6 is an illustrative embodiment of the cryptographic packet processing unit of FIG. 2.

Referring now to FIG. 6, an illustrative embodiment of CPP unit 230 of FIG. 2 is shown. CPP unit 230 comprises a cryptographic bus interface unit 400, a control storage unit 410, a crypto-processing unit 420, a data storage unit 430, a status unit 440 and a control unit 450. Normally, these units may be implemented onto a single integrated circuit (IC) chip placed within a single IC package; however, it is contemplated that CPP unit 230 may be placed in separate ICs and placed within a multi-chip package or perhaps multiple IC packages. Collectively, all of these units 400, 410, 420, 430, 440 and 450 perform a cryptographic operation on the data portion of the incoming data packet. The type of cryptographic operation performed on the data by crypto-processing unit 420 is in accordance with control information provided by the incoming data packet.

As shown in FIG. 6, in this embodiment, cryptographic bus interface unit 400 is coupled to a cryptographic bus 460. Cryptographic bus interface unit 400 is logic having the capability to operate as packet controller 240 of FIG. 2. In particular, cryptographic bus interface unit 400 receives an incoming data packet, and in response, separates various contents of the incoming data packet for subsequent transmission to other logic. In particular, the control information in the header is transferred to control storage unit 410 while the contents of the data portion is transferred to crypto-processing unit 420. This act of separation may be accomplished, for example, by selecting a fixed number of words as the header. In this embodiment, a 10-word header is used so that the first ten (10) words of a data packet are transferred to control storage unit 410 while the remaining words of the data packet are transferred to crypto-processing unit 420.

As further shown in FIG. 6, cryptographic bus 460 including a data bus 461, a cryptographic bus write strobe 462 (CB_WS#), a cryptographic bus read strobe 463 (CB_RS#), a header command signal 464 (CB_CMD) and handshaking signals 465 and 466. As shown, data bus 461 comprises a 32-bit input data bus (CBI_DATA[31:0]) $461_1$ and a 32-bit output data bus (CBO_DATA[31:0]) $461_2$. However, it is contemplated that a single data bus may be used. CB_WS# 462 and CB_RS# 463 are active-low strobe signals which are used to control the input and output of data packets over data bus 461. CB_CMD 464 is a control signal which, when active, indicates that memory controller 220 of FIG. 2 is writing header information or is reading a current initialization vector. Handshaking signals 465 and 466 indicate when CPP unit 230 is ready to receive data (CB_RDY is active) and when CPP unit has data available to be read out (CB_DA is active). It is contemplated, of course, that cryptographic bus 460 is not limited or restricted to the above-identified signals.

Control storage unit 410 includes logic that provides temporary storage for control information received from cryptographic bus interface unit 400 over first internal bus 470. Examples of the control information include, for example, (i) control word 320 to indicate whether encryption or decryption is to be performed and the type of cryptographic function to be used, (ii) one or more keys 330 and (iii) initialization vector (IV) 340 retrieved from the header of the data packet as shown in FIG. 4. In addition, control storage unit 410 provides an updated IV to cryptographic bus interface unit 400 over second internal bus 475 for exclusive OR'ing with a first data block of the next data packet during CBC mode.

Crypto-processing unit 420 including logic that performs encryption operations on plaintext and/or decryption operations on ciphertext with one or more keys provided by control storage unit 410. When conducting cryptographic operations in accordance with DES, crypto-processing unit 420 can accomplished 16 rounds of DES operations in eight 33 megahertz clocks. Upon completing the encryption/decryption operations, the ciphertext/plaintext is loaded into storage unit 430.

As further shown in FIG. 6, storage unit 430 includes logic configured with a sufficient bit width (e.g., 64-bit width) to store a plurality of 64-bit words. Examples of this logic include, for example, volatile memory such as dynamic random access memory (DRAM). Such storage is permissible until cryptographic bus interface unit 400 is ready to receive digital information to be routed over cryptographic bus 460.

Status control unit 440 includes at least one register to store a bit code used to indicate the status of the CPP unit to a general microprocessor. After an error is encountered, the contents of status control unit 440 are read by the general microprocessor to determine the cause of the error. This is accomplished through the use of read (RD) and write (WR) strobe signals 441 and 442, an address bus 443 and a data bus 444.

Coupled to first internal bus 470, control unit 450 includes logic that coordinates the transfer of information within CPP unit 230. This includes scheduling the keys during a cryptographic operation, counting the number of bytes processed, and checking for error or abnormal conditions. Examples of these error or abnormal conditions include (i) an incorrect header length, (ii) an incorrect data packet length, (iii) a data frame fault where the data block is not constrained in accordance with 64-bit boundaries, (iv) an initialization vector read fault where the IV data is not read before a new current data packet IV is received, (v) a write fault where a direct memory access (DMA) write occurs before the CPP unit is ready, and (vi) a read fault where a DMA read occurs from the CPP unit when no data is available. On detecting any of these faults, the CPP unit will set appropriate bits in status control unit 440, will set an interrupt (INT) signal of signal line 451 active, and will cease operations until a software or hardware reset is received.

Figure 7:
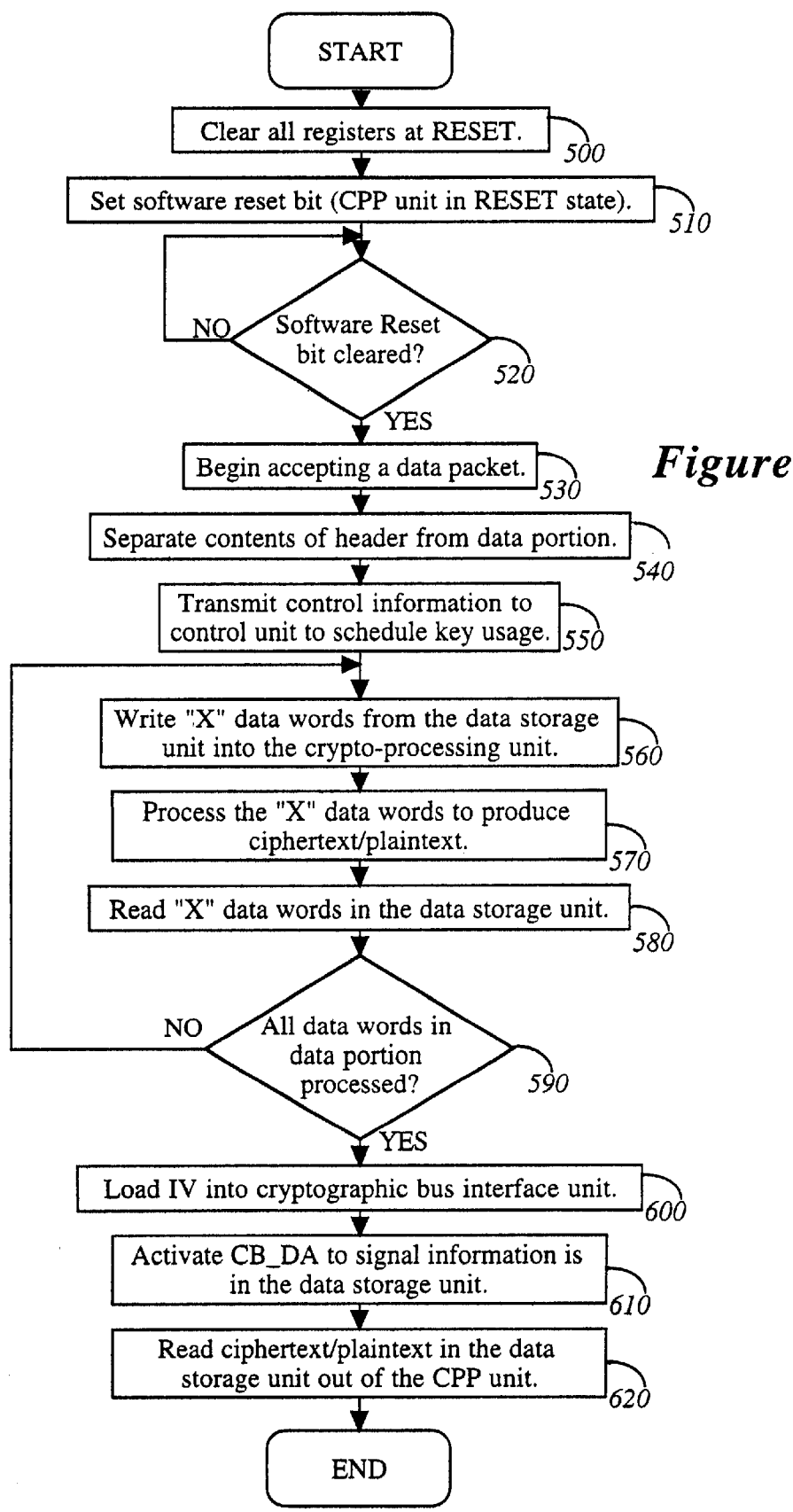
FIG. 7 is an illustrative flowchart including general operations of the cryptographic packet processing unit of FIG. 6.

Referring now to FIG. 7, a general flowchart illustrating the general operations of an embodiment of the CPP unit is shown. At RESET, all registers are cleared asynchronously (block 500). A software reset bit in status unit 440 of FIG. 6 is set, which causes the CPP unit to remain in a Reset state until the software reset bit is deactivated (blocks 510 and 520). Deactivation of the software reset bit is accomplished by the general purpose microprocessor. Then, the CPP unit enters into an Idle state until it starts to accept digital information over the cryptographic bus (block 530). The CPP unit interprets the first ten words of the data packet as its header which is formatted in accordance with FIG. 3.

In particular, cryptographic bus interface unit of the CPP unit separates the control information in the header (e.g., control word(s), key(s), IV) from the data portion and transmits the control information to the control storage unit (blocks 540 and 550). The control unit schedules the use of appropriate keys stored in the control storage unit for use by the crypto-processing unit. In block 560, the remaining data portion is loaded into the data storage unit one data block at a time. The data block is X data words, where "X" is a positive whole number (e.g., X=64 in this embodiment).

From the data storage unit, X data words are written to the crypto-processing unit (block 560). These data words are processed to produce ciphertext or plaintext, which is read back to the data storage unit (blocks 570 and 580). This process continues until all of the data words in the data portion have been processed (block 590). Also, the current initialization vector is loaded into the cryptographic bus interface unit (block 600). The IV is used for encryption or decryption of the next data block if cipher block chaining mode is used for example. When the information is available in ciphertext or plaintext, the cryptographic bus interface unit activates the CB_DA signal to indicate that data is available to read out by the memory controller (block 610). In response, the memory controller activates the CB_WR signal to cause data stored in storage unit 430 to be read out over the CBO_DATA[31:0] bus (block 620).

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. An apparatus comprising:
   a cryptographic bus interface unit to separate control information within a header of an incoming data packet from a data portion of the incoming data packet, the control information includes at least one control word and at least one key, the cryptographic bus interface unit including a plurality of inputs to receive at least one of a read strobe signal, a write strobe signal and a header command signal; and
   a crypto-processing unit coupled to the cryptographic bus interface unit, the crypto-processing unit to perform a cryptographic operation on the data portion.

2. The apparatus of claim 1 further comprising:
   a control storage unit coupled to the cryptographic bus interface unit, the control storage unit to contain the control information and to provide at least a selected portion of the control information to the crypto-processing unit to control the cryptographic operation.

3. The apparatus of claim 1, wherein the control word includes a first bit field indicating whether encryption or decryption is to be performed on the data portion of the incoming data packet.

4. The apparatus of claim 3, wherein the control word further includes a second bit field containing a byte count to indicate a number of bytes forming the incoming data packet.

5. The apparatus of claim 4, wherein the control word further includes a third bit field indicating a type of cryptographic operation to be performed by the crypto-processing unit.

6. The apparatus of claim 5, wherein the type of cryptographic operation performed by the crypto-processing unit includes an operation in accordance with a Data Encryption Standard.

7. The apparatus of claim 1, wherein the crypto-processing unit includes logic to perform one of an encryption operation and a decryption operation on the data portion.

8. The apparatus of claim 1, wherein the crypto-processing unit includes logic to perform a one-way hash operation on the data portion.

9. The apparatus of claim 1 further comprising a data storage unit coupled to the crypto-processing unit, the data storage unit to receive ciphertext from the crypto-processing unit.

10. The apparatus of claim 9 further comprising a status unit to provide information regarding an operational state of the apparatus.

11. The apparatus of claim 1, wherein the cryptographic bus interface unit further includes an handshaking interface, the handshaking interface to provide a first handshaking signal to indicate that the crypto-processing unit is ready to receive data and a second handshaking to indicate that the crypto-processing unit has data ready to be to read out.

12. An electronic system comprising:
a memory controller; and
a cryptographic packet processing unit coupled to the memory controller, the cryptographic packet processing unit comprises a cryptographic bus interface unit having a plurality of inputs to receive at least one of a read strobe, a write strobe signal and a header command signal to indicate whether the memory controller is writing header information or is reading an initialization vector from the cryptographic packet processing unit.

13. The electronic system of claim 12, wherein the cryptographic packet processing unit, which receives an incoming data packet including a header and a data portion and performs a cryptographic operation on the data portion based on control information in the header, further comprises:
a crypto-processing unit coupled to the cryptographic bus interface unit, the crypto-processing unit to perform the cryptographic operation; and
a control storage unit coupled to the cryptographic bus interface unit, the control storage unit to contain the control information and to provide at least a selected portion of the control information to the crypto-processing unit to control the cryptographic operation.

14. The electronic system of claim 12, wherein the control information includes at least one control word and at least one key.

15. The electronic system of claim 14, wherein the control word includes a first bit field indicating whether the cryptographic operation to be performed on the data portion of the incoming data packet is encrypted and alternatively decrypted.

16. The electronic system of claim 15, wherein the control word further includes a second bit field to contain a byte count, the byte count indicating a number of bytes forming the incoming data packet.

17. The electronic system of claim 16, wherein the control word further includes a third bit field to indicate whether a type of cryptographic operation to be performed by the crypto-processing unit is in accordance with a Data Encryption Standard.

18. The electronic system of claim 13, wherein the crypto-processing unit of the cryptographic packet processing unit includes logic to perform an encryption operation on the data portion.

19. The electronic system of claim 13, wherein the crypto-processing unit of the cryptographic packet processing unit includes logic to perform a decryption operation on the data portion.

20. The electronic system of claim 13, wherein the crypto-processing unit of the cryptographic packet processing unit includes logic to perform a one-way hash operation on the data portion.

21. The electronic system of claim 13, wherein the cryptographic packet processing unit further comprises a data storage unit coupled to the crypto-processing unit, the data storage unit to write a first predetermined number of data words of the data portion into the crypto-processing unit and to read a second predetermined number of data words from the crypto-processing unit back to the data storage unit.

22. The electronic system of claim 9, wherein the cryptographic packet processing unit further comprises a status unit to provide information regarding an operational state of the cryptographic packet processing unit.

23. An electronic system comprising:
a memory unit;
a memory controller in communication with the memory unit; and
a cryptographic packet processing unit coupled to the memory controller, the cryptographic packet processing unit including
a packet controller to receive an incoming data packet and to separate a header of the data packet from a data portion of the data packet, the packet controller including a plurality of inputs to receive a read strobe signal, a write strobe signal and a command header signal, being a control signal to indicate whether the memory controller is writing header information or is reading an initialization vector from the cryptographic packet processing unit, and
a cryptographic unit coupled to the packet controller and the memory controller, the cryptographic unit to perform a cryptographic operation on the data portion based on control information provided by the header.

24. The electronic system of claim 23, wherein memory controller being coupled to the packet controller over a first cryptographic bus and being coupled to the cryptographic unit over a second cryptographic bus.

25. The electronic system of claim 24, wherein both the first cryptographic bus and the second cryptographic bus are a common bus.

* * * * *